July 5, 1960     E. R. VAN DRIEST     2,943,828
THERMAL AERODYNAMIC DRAG CONTROLLER
Filed Aug. 7, 1956     4 Sheets-Sheet 1
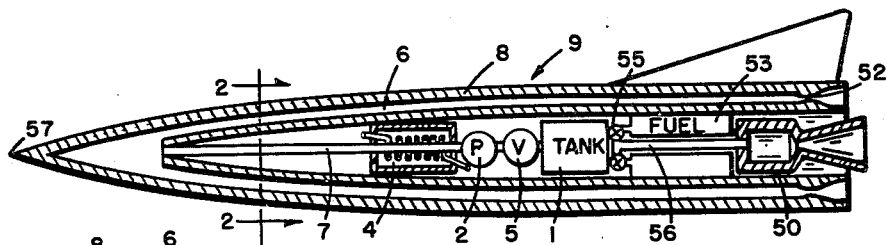
FIG.1
FIG.2
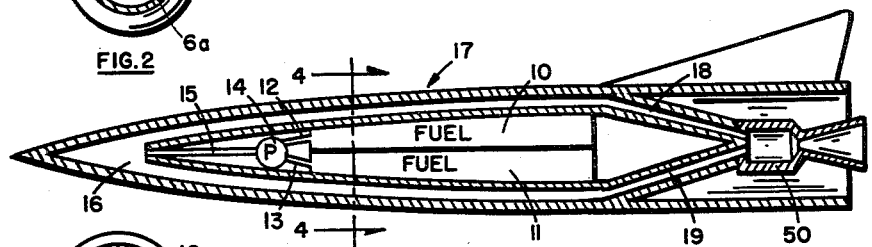
FIG.3
FIG.4
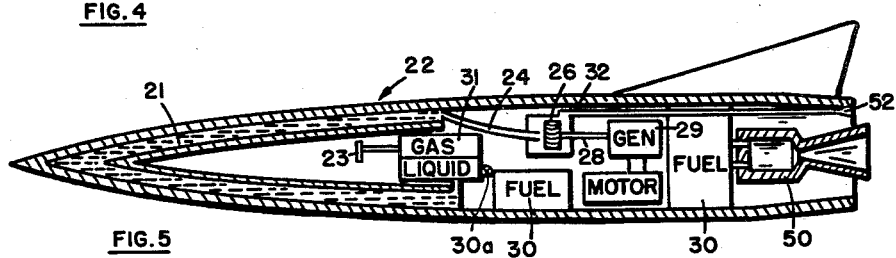
FIG.5
INVENTOR.
EDWARD R. VAN DRIEST
BY Harold J Downes
ATTORNEY July 5, 1960  E. R. VAN DRIEST  2,943,828
THERMAL AERODYNAMIC DRAG CONTROLLER
Filed Aug. 7, 1956  4 Sheets-Sheet 4

*INVENTOR.*
EDWARD R. VAN DRIEST
BY Harold J. Downes
ATTORNEY

United States Patent Office 2,943,828
Patented July 5, 1960

2,943,828

THERMAL AERODYNAMIC DRAG CONTROLLER

Edward R. Van Driest, Whittier, Calif., assignor to North American Aviation, Inc.

Filed Aug. 7, 1956, Ser. No. 602,628

13 Claims. (Cl. 244—117)

This invention concerns a means for decreasing aerodynamic drag upon an airframe by decreasing the temperature of the boundary layer at the surface of the skin of the airframe. This application is a continuation-in-part of application Serial No. 327,401, filed December 22, 1952, now abandoned.

It has been discovered that when the skin of an airframe is extremely smooth and has no discontinuities, the flow, at sufficiently low Reynolds numbers, adjacent to part of the skin is laminar and the boundary layer is said to be stabilized. When the skin of an airframe has this quality wherein the boundary layer is capable of stabilization, the boundary layer usually has three portions which, starting at the forward or front end of the airframe are a stable laminar boundary layer, an unstable laminar boundary layer, and a turbulent layer. When the temperature of the skin of the airframe is increased, the point at which the boundary layer becomes unstable and hence, the transition point between laminar and turbulent flow moves toward the forward end of the airframe, or upstream. When the temperature of the skin of an airframe is decreased, the point at which the boundary layer becomes unstable moves toward the aft end of the airframe, or downstream. At subsonic speeds, the temperature of the skin of the airframe must be lowered by a considerable amount in order to move the position of the transition point between laminar and turbulent flow downstream by a significant amount. At supersonic speeds, a small decrease in the temperature of the skin of the airframe causes the transition point between laminar and turbulent flow to move downstream by a large amount, and when the temperature reaches a certain predetermined critical value, turbulence adjacent to the skin of the airframe is completely eliminated. At supersonic speeds it is possible to cool sufficiently to stabilize the boundary layer for all Reynolds numbers for infinitesimal disturbances. Furthermore, the wall-to-free-stream temperature ratios necessary for complete stabilization are attainable under practical flight conditions. A stable boundary layer adjacent to the skin of the airframe decreases the drag upon the airframe, while turbulence adjacent to the skin of the airframe increases the drag. The cooling of the airframe skin, be it a fuselage, wing or other member, also gives structural advantages since the strength of skin materials is adversely affected by increased temperatures.

The device of this invention contemplates means for removing heat from the skin of an airframe in order to control the temperature of the boundary layer to thereby control the aerodynamic drag upon the airframe.

This invention further contemplates means for utilizing the heat energy which is removed from the skin of an airframe into a liquid heat exchange agent to drive a propulsive means which increases the thrust of the propulsion system of the airframe or drives an auxiliary power device such as an electrical generator or a fuel pump.

It is therefore an object of this invention to control the aerodynamic drag of an airframe by controlling the skin temperature thereof.

It is another object of this invention to provide means for controlling the aerodynamic drag of an airframe by controlling the skin temperature and its relationship with the free stream temperature.

It is another object of this invention to provide means for decreasing the temperature of the skin of an airframe.

It is another object of this invention to provide means for transferring heat and energy from the boundary layer of an airframe to the propulsion system of said airframe.

It is another object of this invention to extract heat from the boundary layer of an airframe to thereby decrease the temperature of the skin and ulitize said heat to drive an auxiliary power device.

A further object of this invention is to provide means for removing energy from the boundary layer of an airframe and converting such energy to increased thrust energy for the airframe.

A still further object of this invention is to provide a means for moving the boundary layer transition point between laminar and turbulent flow rearwardly on an airframe skin.

Other objects of invention will become apparent from the following description taken in connection with the accompanying drawings, in which—

Fig. 1 is a half section of a typical airframe showing one embodiment of the device of this invention;

Fig. 2 is a section view taken at 2—2 in Fig. 1;

Fig. 3 is a half section of a typical airframe showing the device of this invention adapted to preheat the fuel of the propulsion system of the airframe;

Fig. 4 is a section view taken at 4—4 in Fig. 3;

Fig. 5 is a half section view of a typical airframe showing the device of this invention adapted to drive an auxiliary power device;

Figure 15:
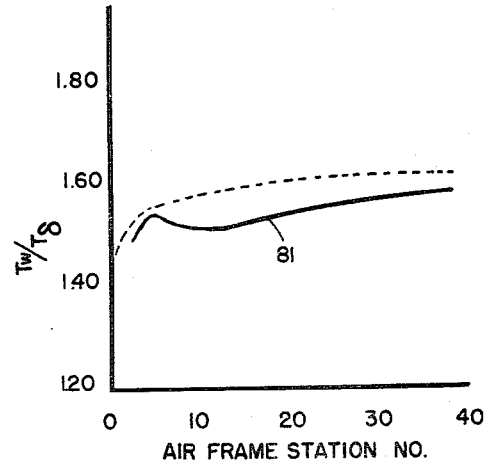

And Fig. 15 shows wall-to-free-stream temperature ratio as a function of distance along an airframe skin.

In Figs. 1 and 2 a tank 1 generally containing a fluid (liquid, gas or slurry) is connected to a pump 2 through a valve 5, the pump 2 being adapted to move the fluid within the tank 1 through a heater exchanger 4. The fluid-conducting inner structure of heat exchanger 4 is connected by a pipe 7 to an annular duct means 6 extending around the internal periphery of an external skin 8 of an airframe generally designated as 9. In the embodiment shown in Fig. 1 ducts 6 have one side in common with the external skin 8; ducts 6 are vented to the outer air and may contain nozzles 52 at the rearward end of the duct means 6 to provide expansion of the fluid passing rearwardly through the duct to augment the thrust of the rocket or jet or ramjet engine 50 or other device providing the prime motive force for the airframe. Various fluids may be contained in tank 1. These include gasoline, a JP fuel, a typical example of which being a gasoline-type hydrocarbon having approximately 20 percent aromatics, or liquid nitrogen, liquid sodium, sodium-potassium liquid or slurry or other fluid having heat exchanging capabilities. Tank 1 may be independent of the supply of fluid for the engine 50 or may be connected through a series of valves 55 to fuel tanks 53 which supply the propellant for the engine 50. Control valves 55 can control the fuel flow either direct to the engine 50 or bleed off a portion to be conducted as a coolant through the ducts 6. Fuel line 56 is connected between fuel tanks 53 and injector means (not shown) on the forward end of the engine 50. The heat exchanger 4 per se is of conventional construction providing for either cross-current or counter-current flow of the fluid within tank 1 with a coolant liquid, gas or solid such as Freon, liquid nitrogen, liquid ammonia or Dry Ice. The heat exchanger is used when it is desired to precool the liquid before it is passed through pipe 7 to ducts 6 and rearwardly along the inside periphery of the external skin 8. As in such conventional heat exchangers the heat from the fluid is taken up by the coolant, the coolant then typically being compressed, cooled by either rejecting the heat overboard or by transferring the heat to the fuel entering the engine by preheating, and then the coolant is recycled. As hereinafter described in more detail the passage of the coolant fluid through the ducts 6 acts to move the transition point between laminar flow and turbulent flow rearwardly from a forward station such as the nose station 57. Fig. 2 is a cross sectional view taken on a forward part of the airframe 9 and includes partition members 6a extending longitudinally within the annular duct 6 through which the cooling fluid flows.

Figs. 3 and 4 show a modification of the basic device in which all or a major part of the fuel in tanks 10 and 11 is conducted through pipes 12 and 13 and by pump 14 pumped through pipe 15 into an annular duct 16 similar to that described with respect to Fig. 1. The travel of the fuel rearwardly from a forward station in heat exchanging relationship to the external skin of the airframe 17 acts to preheat the fuel which is passed through pipes 18 and 19 into an injector or the like associated with the prime mover or engine 50. By reason of the passage of the fuel exteriorly of the fuel tanks 10 and 11 the volume of fuel in the tanks acts as a cold sink increasing the coolant capabilities of the fuel as it passes through duct 16. The preheating of the fuel before it is introduced into engine 50 acts to increase engine efficiency as is well known in the art.

Fig. 5 discloses a further modification of the thermal aerodynamic drag controller in which an annular duct 21 in juxtaposition with the inner periphery of the external skin of the airframe 22 extends from a forward station at the nose of the airframe rearwardly over the area desired to be corrected in external flow characteristics. The duct or ducts 21 in this embodiment act as tanks for the storage of a cool fluid such as liquid nitrogen, liquid hydrogen, or Freon which acts as a skin coolant. If desired, a pressure is kept on the liquid within duct 21 by reason of an accumulator 31 which has a source of pressurized gas 23 on one side of a flexible diaphragm separating this gas from the liquid being fed into duct 21. The coolant fluid in certain applications may be confined entirely within the duct means 21, dispensing with a coolant sump. In this event the fluid-containing source is within the duct or adjacent ducts and the means to flow the fluid would typically be a means to pressurize the fluid directly as by an inert gas or by reason of the inherent movement of the volatiles through the duct means to pipe 24. When and if the coolant fluid is also the fluid being used as the working fluid within the prime mover 50, a bleed-off 30a may be provided from a fuel tank 30 into the liquid chamber of accumulator 31. In operation, heating of the skin surface due to flight conditions is such that the fluid within the duct 21, in heat exchanging relationship with the airframe skin, absorbs the skin heat and when sufficient heat is absorbed, volatilizes, and the resultant volatiles are then conducted through pipe 24 to an auxiliary power device 26, typically a turbine or piston-type engine, which in turn drives a shaft or other linkage 28 which may be connected to a responder or energy utilizing device 29. Device 29 may be any means to do useful work driven by the fluid exiting from the duct. It may be an electric generator, a liquid pump, an alternator, a fan blower, or other type of gas or hydraulic pump. By reason of the cooling of the skin surfaces the aerodynamic drag upon the exterior of the airframe 22 is substantially decreased. Exhaust gases from the turbine or means 26 are conducted or vented to the atmosphere through pipe 32 which is provided with a nozzle section 52 at the rear end thereof to expand the waste products and to augment the thrust of the overall airframe. In certain applications the thrust emanating from nozzle section 52 is sufficient to provide the main thrust for the vehicle, thus dispensing with all other prime movers save an expendable booster to provide original starting thrust. The basic function of the auxiliary power device 26 is to provide power for auxiliary devices within the airframe 22.

Figure 6:
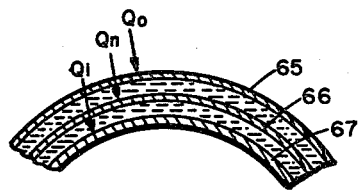
Fig. 6 shows a cross sectional view of a double walled duct with the heat inputs thereto.

Fig. 6 shows a cross sectional view of a double annulus type of duct which may be embodied in the present invention. The heat $Q_o$ flowing from the boundary layer is transmitted to the liquid contained between walls 65 and 66. Part of this heat is absorbed by the liquid and the remainder $Q_n$ is transmitted through wall 66 to the liquid contained in the inner-annulus between walls 66 and 67. Here again part of the heat is absorbed by the liquid and part $Q_i$ by the wall 67. Heat from the wall 67 will be transmitted to the liquid within the inner-wall 67. In the case of the Fig. 3 modification this fluid will be in the fuel tanks 10 and 11. Reference may be had to Heat Transmission—McAdams, W. H., McGraw-Hill Co., 3d ed., 1954; Thermodynamics of Fluid Flow—Hall, N. A., Prentice-Hall, Inc., 1951; and Elements of Heat Transfer—Jakob, M. and Hawkins, G. A., Wiley Co., 1942, for the method of solving the necessary differential equations for the heat transfer problem set out in the various modifications of the heat transfer annuli. From these equations the amount of flow of fluid can be calculated which is necessary to conduct sufficient heat away from the skin to insure the proper ratio of the temperature of skin to the free airstream temperature insuring laminar flow.

Figure 7:
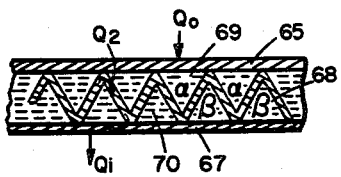
Fig. 7 shows the heat inputs to a section of a preferred form of annular duct.

Fig. 7 shows the heat transfer in a transverse section of a preferred form of annulus. This annulus not only provides good heat transfer characteristics but gives further strength to the overall airframe structure. U.S. Patent No. 2,747,064 shows the sandwich construction of Fig. 7 in detail. Heat $Q_o$ flowing from the boundary layer will first enter the outer skin 65. Part of the heat will enter the section 69 through the outer wall and part $Q_2$ will enter the web 68. Heat will then be transferred along the web as well as to the liquids in sections 69 and 70. Heat will arrive at the inner wall 67 via the web 68 and the liquid in section 70. This heat $Q_i$ will then be transmitted from inner wall 67 to the internal of the airframe. From the equations set out in the above-mentioned reference books the temperature of the various walls and the quantity of heat necessary to be transferred to insure a satisfactory wall-to-free-stream temperature ratio may be determined.

Figure 8:
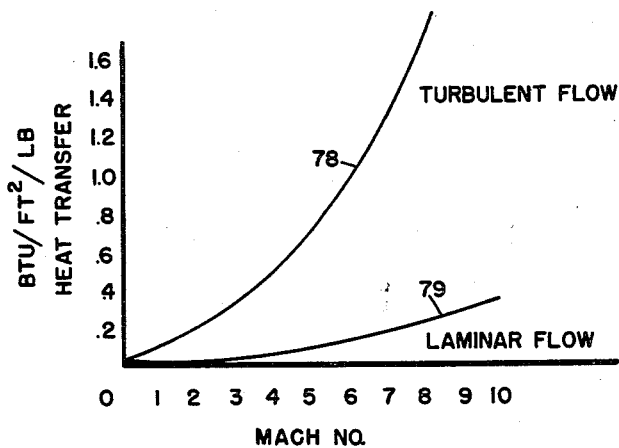
Fig. 8 shows graphically the heat transfer on an airframe skin as a function of Mach number.

As set out above, the boundary layer air is maintained in a state of laminar flow thus reducing the actual heat input to the airframe and reducing the heat transfer to the exterior skin. Fig. 8 graphically demonstrates the heat problem and illustrates the advantages to be gained from a heat transfer standpoint if laminar flow is maintainer. It is to be noted that at certain Mach numbers that practically a tenfold decrease may be had in heat transfer characteristic by maintaining laminar flow (curve 79) rather than turbulent flow (curve 78). In turbulent flow heat transfer increases very rapidly with increasing Mach number as distinguished from the slower increase as seen from the laminar flow curve 79.

Figure 9:
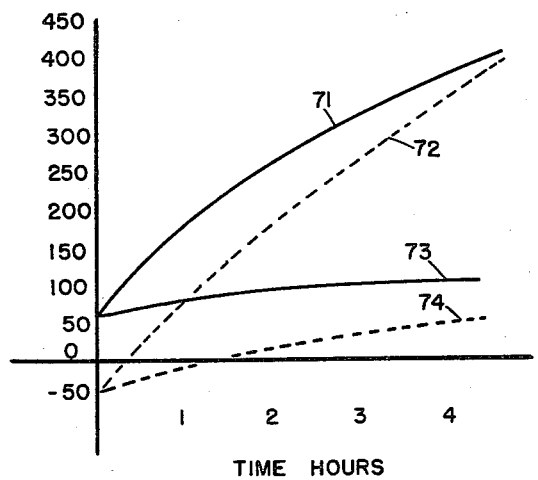
Fig. 9 shows graphically the temperature of a fuel as a function of time at a predetermined supersonic speed.

Fig. 9 shows the advantage of the present invention in terms of fuel temperature during the course of an airframe flight over finite time intervals. In the case of turbulent flow, curve 71 illustrates a temperature increase of from about 70° F. to 400° F. in approximately four hours for a typical airframe fuel volume. If the fuel is precooled at start of flight to a value of about −50° F. the function of fuel temperature against hours will have a greater slope as is shown in curve 72, ending up with a temperature just below the uncooled fuel after four hours. When the airframe is flying under laminar flow conditions only a slight rise in fuel temperature is apparent as illustrated in curve 73. Likewise if the fuel is precooled to −50° F. the fuel will retain the advantages of this precooling after four hours flight time to a relatively high degree as seen in curve 74.

Figure 10:
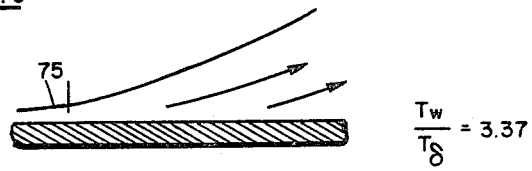
Fig. 10 shows boundary layer conditions without heat transfer through the skin of an airframe.
Figure 11:
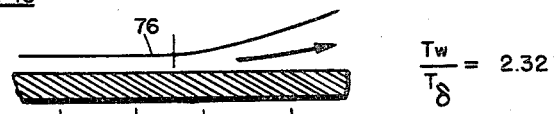
Fig. 11 shows boundary layer conditions with a small degree of heat transfer through the airframe skin.
Figure 12:
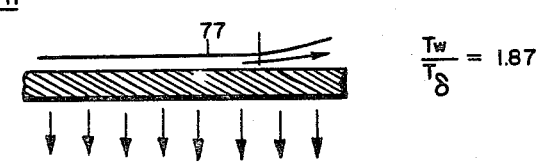
Fig. 12 shows the desired form of boundary layer condition with the prescribed amount of heat transfer through the airframe skin.

Figs. 10 through 12 show diagrammatically the effect of no heat transfer on a skin surface, a slight heat transfer from the surface and a prescribed heat transfer on the skin surface. It can be seen that the boundary layers are such that the laminar flow areas 75, 76 and 77 respectively are moved to the right or rearwardly when heat is carried away from the skin surface in prescribed amounts. The upperly curving lines in each of Figs. 10 through 12 represent turbulent flow conditions and the vertical line is the point of transition between laminar and turbulent flow.

Figure 13:
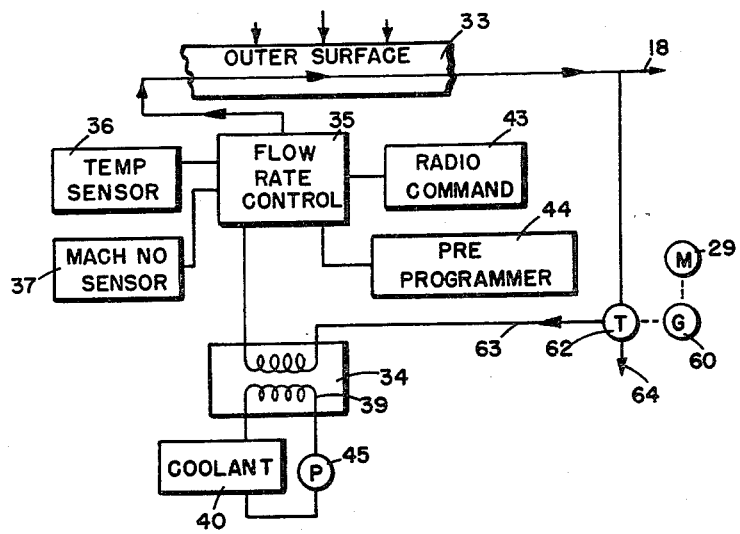
Fig. 13 shows a block diagram of a typical embodiment of the invention utilizing heat energy from the boundary layer air to drive an auxiliary device or augment the thrust of the airframe.

Fig. 13 is a block diagram showing a means to control the rate of flow of a fuel or other coolant through the duct means adjacent to the external skin to keep the ratio of the temperature of the skin wall-to-the-free-stream temperature at the edge of the boundary layer in a predetermined range. The block diagram in Fig. 13 combines some of the features of the modifications seen in Fig. 1, Fig. 3 and Fig. 5. Flow of the coolant fluid is commenced through the system by a pump or the like (not shown) from a tank containing the desired coolant (not shown). Control of the rate of flow is had by a flow rate controller 35. The liquid or coolant flows through this controller in heat exchange relationship with the airframe external skin surface 33 where it picks up heat from the boundary layer and is then conducted either through line 18 directly to the prime mover engine or alternatively is passed into a turbine 62 which is mechanically connected to a generator 60 adapted to drive a responder 29 such as a motor. Turbine 62 may drive responder 29 directly. Fluid passing through turbine 62 may be exhausted at 64 in the same direction as the main engine thrust to provide additional rearward thrust for the airframe or may be vented directly overboard. Alternatively the fluid flowing through turbine 62 may be conducted through line 63 into a secondary heat exchanger 34 in which the picked-up heat in the fluid is transferred to a coolant loop comprised of coils 39 through which a coolant contained in a storage device 40 is passed by means of pump 45. Furthermore, straight recirculation of the fluid may be accomplished especially at times of high heat inputs. Control of flow rate may be had by providing a temperature sensor together with appropriate voltage amplifiers to cause the rate of flow of the working substances to be dependent upon the temperature of the skin. Typically, this sensor 36 may be a thermopile or thermocouple which has a voltage output. A Mach number sensor 37, typically being a conventional Mach meter, in combination with suitable voltage amplifiers, is also adapted to forward voltage signals into the flow rate controller. Flow rate controller 35 may thus be a variable fluid valve adapted to be controlled by an electrical signal. An example of such valve may be seen in U.S. Patent No. 2,655,937. The flow rate control of 35 also may be controlled by means of a radio command device 43 adapted to receive ground signals to vary valve settings or be controlled by a pre-programer 44 such as a tape recorder or computer combination as is known in the valve control art. The use of the various variables set out above will become apparent from the following discussion with respect to variables effecting laminar and turbulent flow.

It is to be realized that the system illustrated in the above figures may also incorporate the use of intermediate working substances such as liquid metals in an outer annulus to first convey the heat from the skin of the airframe and to conduct the heat to the substances to be vaporized or preheated in an inner annulus. The presently described overall system may be used to provide for the skin cooling which is necessary in the re-entry of an airframe into the atmosphere at high speeds.

Figure 14:
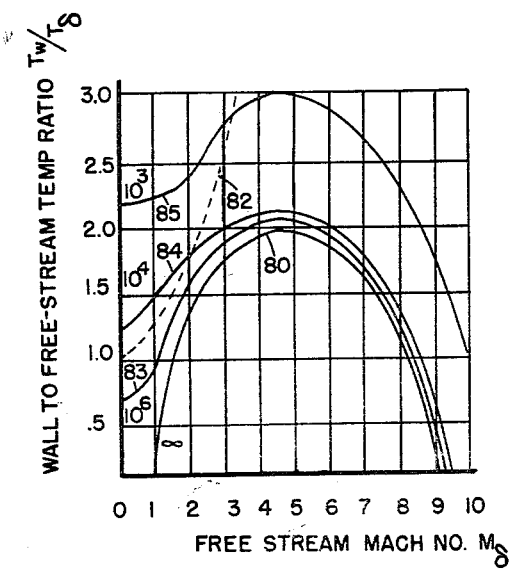
Fig. 14 shows graphically the necessary wall-to-free-stream temperature ratio as a function of the free stream Mach number.

Fig. 14 illustrates the temperature ratio required for complete stabilization of the laminar boundary layer on a flat plate. Surfaces which are slightly curved will have pressure gradients on the surface which will change the curve slightly. The area under the curve 80 gives a stable boundary layer for all or infinite Reynolds numbers. Curve 80 is the basic curve from which a family of curves can be drawn for lower Reynolds numbers. The absorbtion of the boundary layer heat by the skin is sufficient to bring about complete stability if a prescribed temperature ratio between the wall and the free stream temperature at the edge of boundary layer $T_w/T_\delta$, represented by the area under curve 80, is kept. It is to be realized that the extent to which stabilization of the boundary layer is necessary is dependent upon the particular airframe design, speed, and other variables heretofore and hereafter mentioned. Curve 82 represents the curve for an insulated plate without heat transfer. It can be seen that the amount of cooling necessary to get below curve 80 from curve 82 thus obtaining laminar flow in a Mach number range of from 1–3 is relatively small. Curves 83, 84 and 85 represent others in the family of curves mentioned above for Reynolds numbers of a million, 10,000 and 1,000 respectively. These curves may be derived theoretically or experimentally in a wind tunnel by determining the actual instability point of laminar flow under the particular flight conditions of the airframe, such as Mach number and Reynolds number. For a given Reynolds number the ratio of skin to free stream temperature at a particular Mach number must be below the corresponding curve for that Reynolds number in Fig. 14 in order to have a stabilized boundary layer insuring laminar flow at the particular point on the external surface of the airframe skin. In some instances it might be desirable to provide the optimum control conditions over only one-half the airframe surface, other areas being designed to withstand structurally and aerodynamically other than laminar flow.

Fig. 15 shows a curve 81 for a typical airframe structure along all stations 0 to 40 from the nose section of the airframe plotting station location versus the wall-to-free-stream temperature ratio. By controlling the rate of flow of fluid through the duct means in juxtaposition to the skin, this ratio is kept below the dashed line insuring stabilization and laminar flow across that airframe area. The flow passages may be of varying size in annular cross section as the duct means extends at least partially coextensive with the skin in order to compensate for airframe contours and the varying heat inputs due to airframe shape. Further, it is generally necessary to circulate or recirculate the coolant at higher rates when the Reynolds number is increasing rapidly as at the start of an airframe flight or at the necessarily low beginning flight speeds.

The following example illustrates a method of calculating the desired $T_w/T_s$ ratio which can be pre-programed or computed during flight. The equation for local heat transfer from the boundary layer to fuel as in Fig. 3 is based on the total heat from the boundary layer minus the net radiation to the atmosphere equals the heat conducted into the fuel and is shown by:

$$h_{b_x}(T_b - T_{w_x}) - \epsilon(\sigma T_{w_x}^4 - G) = h_{t_x}(T_{w_x} - T_{t_x}) \quad (1)$$

and for the total heat flow $$2\int_{x_1}^{x}[h_{b_x}(T_b - T_{w_x}) - \epsilon(\sigma T_{w_x}^4 - G)]\pi r_x dx$$
$$= 2\int_{x_1}^{x} h_{t_x}(T_{w_x} - T_{t_x})\pi r_x dx = w_t c_{p_t} \int_{T_{t_1}}^{T_t} dT_{t_x} \quad (2)$$

In these equations $x$ is the distance along the airframe and $r_x$ the radius of the airframe at station $x$. Also, T is the absolute temperature, $h$ coefficient of heat transfer, $\epsilon$ coefficient of emissivity, $\sigma$ Stefan-Boltzmann radiation constant, G heat absorption from space, $w_t$ weight flow of fuel, and $c_p$ specific heat of fuel. Subscripts $b$, $w$, and $f$ refer to boundary layer, outer wall, and fuel, respectively.

Equations 1 and 2 are solved simultaneously for $T_{w_x}$ and $T_{f_x}$ by successive approximations assuming various possible reservoir fuel temperatures. Other data could be: stainless steel skin, NACA standard day, emissivity=0.5, skin thickness=0.032 inch, radiation from space=200 B.t.u. per hour per square foot, recovery factor=0.85 for laminar flow in computing the boundary layer temperature $T_b$. $T_s$ and $M_s$ are calculated from the flow field about the airframe during flight. The boundary layer temperature $T_b$ is computed from the following relationship $$T_b = T_s\left(1 + r\frac{\gamma - 1}{2}M_s^2\right)$$

Where $r$ is the recovery factor and $\gamma$ is the ratio of specific heats at constant pressure and volume.

Although the invention has been described and illustrated in detail, it is to be clearly understood that the same is by way of illustration and example only and is not to be taken by way limitation, the spirit and scope of this invention being limited only by the terms of the appended claims.

I claim:

1. Means to move the boundary layer transition point between laminar flow and turbulent flow on the exterior surface of an airframe skin in forward flight comprising a fuel tank within an airframe formed by said airframe skin, duct means in contact with the interior surface of said skin and extending rearwardly from forward portions of said skin, a liquid fuel within said tank, means within said airframe to flow said fuel rearwardly through said duct means in heat exchanging relationship with said skin and control means connected to said last-mentioned means to vary the rate of flow of said fuel to keep the ratio of the temperature of the skin wall-to-the-free-stream temperature at the edge of the boundary layer in a predetermined range, said control means being variable as a function of skin temperature and Mach number during said forward flight.

2. A thermal aerodynamic drag controller for supersonic flight comprising an airframe having an external skin, tanks including duct means adjacent the skin of said airframe and extending rearwardly from a predetermined station on said airframe, fluid stored within said tanks and having a temperature lower than said skin during supersonic flight, pipe means connected between said tanks and the air outside of said airframe, an auxiliary power device connected into said pipe means, a responder connected to said auxiliary power device for utilizing the energy therefrom, means to flow said fluid from said tanks through said duct means to said device whereby said fluid decreases the temperature of the boundary layer of said airframe and absorbs heat therefrom to cause the pressure of said fluid to increase and thereby drive said auxiliary power device.

3. In an airframe adapted for supersonic flight, means to control the aerodynamic drag on the skin of the airframe, said means comprising duct means on the interior of the skin extending rearwardly from a predetermined station on said airframe, a fluid-containing source communicating with said duct means, means to flow fluid from said source through said duct means in heat exchanging relationship with the exterior skin, said fluid having a temperature less than the fuselage skin temperature during supersonic flight, and propulsive means on said airframe in communication with said duct means and responsive to the fluid exiting from said duct means.

4. The invention as set out in claim 3 in which said propulsive means is a turbine for generating auxiliary power.

5. The invention as set out in claim 3 in which said propulsive means comprises an engine propelling the airframe and said fluid is engine fuel preheated in said duct means.

6. The invention as set out in claim 3 in which said propulsive means comprises a duct exiting from said airframe to provide an auxiliary thrust outlet.

7. The invention as set out in claim 3 in which the means to flow fluid is a pump and valve combination, and includes sensor means operably connected to said valve for varying the valve setting as a function of said fuselage skin temperature and the Mach number of the airframe in said supersonic flight to give varying fluid flow rates through said duct means.

8. The invention as set out in claim 3 in which the means to flow fluid comprises pressurizing means to assure a constant supply of fluid to said duct means and means to bleed off heated gaseous components of said fluid for driving said propulsive means.

9. The invention as set out in claim 3 including a heat exchanger between said fluid-containing source and said duct means to precool the fluid passing into said duct means.

10. In an airframe having an external skin, means to control the aerodynamic drag thereon in supersonic flight comprising in combination with an airframe skin, a coolant fluid-containing source within the said airframe skin, duct means in juxtaposition to the internal surface of said skin, means connected to said source to flow coolant fluid from said source through said duct means in heat exchanging relationship with the airframe skin and control means to control the heat withdrawn from said skin to said fluid in an amount sufficient to stabilize the boundary layer under the particular flight conditions, said control means comprising means in said airframe operably responsive to signals received in flight to control the flow rate of said fluid through said duct.

11. The invention as set out in claim 10 in which said last-mentioned means includes means operably connected to said airframe and responsive to airframe skin temperature and Mach number for maintaining a relationship of the ratio of said skin temperature to free-stream temperature and the Mach number below a value which is a predetermined function of said ratio and said Mach number at various Reynolds numbers as defined by the family of curves seen in Fig. 14.

12. In an airframe having an external skin, means to control the aerodynamic drag thereon in supersonic flight comprising in combination with an airframe skin, a coolant fluid-containing source within the said airframe skin, duct means in juxtaposition to the internal surface of said skin, means connected to said source to flow coolant fluid from said source through said duct means in heat exchanging relationship with the airframe skin and control means to control the heat withdrawn from said skin to said fluid in an amount sufficient to stabilize the boundary layer under the particular flight conditions, said control means comprising means within said airframe skin to control the flow rate of said fluid through said duct, said control means further comprising means attached to said airframe skin for producing an electrical signal indicative of changes in skin temperature and wherein said means to control the flow rate is a flow valve responsive to said electrical signal.

13. In an airframe having an external skin, means to control the aerodynamic drag thereon in supersonic flight comprising in combination with an airframe skin, a coolant fluid-containing source within the said airframe skin, duct means in juxtaposition to the internal surface of said skin, means connected to said source to flow coolant fluid from said source through said duct means in heat exchanging relationship with the airframe skin and control means to control the heat withdrawn from said skin to said fluid in an amount sufficient to stabilize the boundary layer under the particular flight conditions, said control means comprising means within said airframe skin to control the flow rate of said fluid through said duct, said control means further comprising means for producing an electrical signal indicative of changes in airframe speed and wherein said means to control the flow rate is a flow valve responsive to said electrical signal.

References Cited in the file of this patent

UNITED STATES PATENTS

| | | |
|---|---|---|
| 2,427,972 | Melchior | Sept. 23, 1947 |
| 2,529,102 | Palmatier | Nov. 7, 1950 |
| 2,540,594 | Price | Feb. 6, 1951 |
| 2,723,092 | Paselk | Nov. 8, 1955 |

FOREIGN PATENTS

| | | |
|---|---|---|
| 435,653 | France | Jan. 4, 1912 |
| 612,468 | Great Britain | Nov. 12, 1948 |
| 687,872 | Great Britain | Feb. 25, 1953 |